United States Patent Office 3,785,972
Patented Jan. 15, 1974

3,785,972
CONTAINING AND REMOVING OIL SPILLS
ON WATER
Henry E. Alquist and Armin C. Pitchford, Bartlesville,
Okla., assignors to Phillips Petroleum Company
No Drawing. Filed Dec. 7, 1971, Ser. No. 205,739
Int. Cl. B01d 15/00; E02b 15/04
U.S. Cl. 210—40                                5 Claims

ABSTRACT OF THE DISCLOSURE

A method is provided for containing oil on the surface of water and removing the oil from the water surface by increasing the liquification temperature of the oil to 50–80° F. above the temperature of the water on which it is floating by incorporating a wax into the oil to form a crust-like fused mass which will act as a boundary against extension of the oil mass and which can be easily skimmed from the water surface.

BACKGROUND OF THE INVENTION

This invention relates to containing a mass of oil which is floating on the surface of a body of water. In one of its aspects, it relates to the removal of oil from the surface of a body of water. In another of its aspects, this invention relates to the incorporation of oil into a fused mass with a wax substance.

In one concept of the invention it relates to providing a solidified barrier around an oil mass floating on water, by incorporating a wax into the oil at the periphery of the floating mass.

In another concept of the invention it relates to facilitating the removal of an oil mass from an aqueous surface by incorporating a wax with the oil raising the liquification temperature of the oil to produce a solid mass easily skimmed from the water surface.

Ecological damage from surface contamination by oil presents a problem in most of the commercial waterways of the world. Open coastal waters, estuaries, and lakes are areas where the spillage of oil is of most serious concern. Industrial slush ponds also present a continuing problem for removal of oily surface waste. Of particular interest is the contamination caused by spills of crude oil.

The problems associated with oil spills on water surfaces have become well known. Up to this time no really effective means has been found for containing a mass of oil floating on a water surface. It is important both to be able to confine the spread of an oil mass on a liquid surface and to be able to remove the mass of material from the water surface.

It is therefore an object of this invention to provide a method for containing oil spills on water.

It is another object of this invention to provide a method for removing oil from the surface of water.

Other aspects, objects and advantages of this invention will be apparent from the disclosure and the claims.

Broadly, the invention provides a method for producing a coherent mass containing oil which is sufficiently solidified that it can be removed from the surface of water. This method consists of applying to the surface of the oil (1) a wax in a mixture with (2) a volatile substance which can be inflammable, allowing the volatile substance to evaporate or igniting the inflammable substance to form a coherent mass of the wax and oil.

In one embodiment a coherent mass containing oil is produced which permits the removal of the mass of oil from the surface of the water.

In another embodiment a coherent mass containing floating oil is produced on the periphery of a floating oil mass to retain the oil and prevent its spreading over the surface of the water. For large spills a containing ring of fused polymer 6 to 10 feet in radial thickness at the perimeter of the spill can be developed. This method can be used to build a ring 6 inches to a foot or more in vertical thickness which will contain the oil in the center until it can be pumped out.

In the practice of this invention the ultimate objective is to convert heavy oil floating on the surface of water into a substance hard enough that it can be readily skimmed or lifted from the water or to convert the perimeter of a large spill into a solid sufficiently hard to contain the larger center core of liquid oil until the liquid can be pumped out by a skimmer. A satisfactory solid is produced when the liquification temperature of the spilled oil is raised from about 50 to about 80° F. above the temperature of the water upon which the oil is floating.

By the method of this invention the differential in the oil liquification and water temperatures can be produced by incorporating crude wax into the oil floating on the water surface. The method of this invention is subject to variations which comply with the requirements of the two major variables in treating oil spills. These variables are the temperature of the water on which the oil is floating and the inherent pour characteristics of the oil. For example the temperature of sea water in the commercial shipping lanes where spills most often occur can vary from 20 to 60° F. Heavy crude oils usually have pour points varying between +40° F. and −60° F. or even lower. When a high pour point oil is spilled on cold water very little wax is required to meet the 50 to 80° F. differential in the liquification temperature of the oil and the water temperature. On the other hand, a high water temperature and spilled oil with an inherently low pour point require a large amount of wax to achieve the desired differential between liquification point of the oil and the water temperature.

Waxes suitable for use in this invention include any low temperature melting wax such as the paraffinic waxes, naturally occurring ozocerite, carnauba wax, $C_{12}$ to $C_{25}$ alcohols and fatty acids such as stearic or palmitic. The concentrations of the waxes will vary depending on the melting point of the wax, its solubility in the particular oil with which it is used and the temperature of the sea water. Additions of wax in the order of 5 to 50 percent by weight of the oil are effective. Preferably a range of 10 to 15 percent by weight of wax added to the oil should be used.

EXAMPLE I

In a flat pan containing about two quarts of water at 60° F., 30 milliliters of very heavy Morichal crude oil from Venezuela (which has +40° F. pour point) was spilled on the surface. About 4 milliliters of wax-hydrocarbon mixture was sprayed evenly over the surface of the floating crude oil. The sprayed oil was then ignited and in a few seconds the light hydrocarbons were consumed and the fire went out. In a few more seconds the crude oil-wax mixture cooled and solidified into an asphalt-like material which was readily removed with a spatula.

EXAMPLE II

In a flat pan containing about two quarts of water at about 60° F., 30 milliliters of very heavy Morichal crude oil from Venezuela (which has a +40° F. pour point) was spilled on the surface to produce an oil float approximately 6 to 8 inches in diameter. The perimeter of this spill was sprayed with a wax-hydrocarbon mixture, and ignited. An asphalt-like crust ring about one inch wide was produced around the perimeter of the spilled oil. This ring retained the center liquid pool of crude oil even though waves were induced in the pan of water to a height of approximately one inch.

An important aspect of the procedure used in this invention is obtaining even distribution of the wax in the spilled oil. This was achieved in the laboratory experiments by heating a sample of Sink Draw crude oil from Duchesne County, Utah to approximately 150° F. and blending it with 20 to 30 weight percent of kerosene. The Sink Draw crude oil is very waxy. About 85 percent of this crude boiled above 400° F. and its pour point was higher than about 50° F. The kerosene reduced the viscosity so that the mixture could be sprayed in fine droplets. The kerosene served the purpose of supplying the necessary volatile, flammable hydrocarbon to aid on ignition in melting the wax. It should be evident to one skilled in the art, however, that an easily sprayable material can be obtained by heating a waxy substance to reduce its viscosity. The addition of a hydrocarbon diluent is necessary only where a flammable constituent is not supplied by the floating crude oil.

It will be obvious to one skilled in the art that it is not always necessary to ingite the crude oil-like hydrocarbon-wax mixture. The advantages of the burning step is to reduce the time required to obtain a solid crude oil-wax and to reduce the amount of wax required to produce a solid. The ignition step achieves these advantages by removing the light hydrocarbons from the heavy oil thus raising the inherent pour point of the oil and also provides better distribution of the wax in the crude oil.

The table below shows the increase in pour point temperature produced by the addition of various weight percents of slack wax to an Iranian crude oil by the method shown in Example I.

TABLE I

Effect of 250 petrolatum from the Kansas City lube plant on the pour point of Iranian crude oil

| Wt. percent slack wax: | Pour point, F. |
|---|---|
| 0 | −25 |
| 1 | −10 |
| 2 | −10 |
| 3 | −10 |
| 4 | −10 |
| 5 | 0 |
| 7.5 | 0 |
| 10 | +25 |
| 15 | +40 |
| 20 | +55 |
| 100 | +155 |

The table points out the effectiveness of 10 to 20 percent by weight of slack wax in raising the pour point of the crude oil 50 to 80° F. This is an example of the use of a specific wax with a specific type crude oil. As stated above variations in the amount of material needed will occur with the use of various crude oils.

The technique disclosed above is effective for use with crude oil or sludge oils, such as typical Middle Eastern crudes, containing relatively little light hydrocarbon ends.

The ignition of the flammable substance will ignite some of these light ends, but with the water below the crude oil acting as a heat sink the crude oil will not continue to support combustion. In fact, many crude oils contain such a small percentage of volatiles that there can be no combustion without supplying a flammable material as part of the mixture of this invention.

Reasonable variation and modification are permissible within the scope of the disclosed invention the essence of which is that a crude wax can be incorporated with crude oil floating on the surface of water to raise the liquification temperature of the crude oil about 50–80° F. above the temperature of the water upon which the crude oil is floating so that the crude oil mass is solidified.

What is claimed is:

1. A method for producing on the surface of water a coherent mass containing oil sufficiently solidified that it can be removed from the surface of the water, said method comprising:
   (1) applying to the surface of an oil mass floating on water a mixture of wax and a volatile, inflammable substance, said inflammable substance in sufficient amount to provide on ignition the amount of heat necessary to fuse the wax, and
   (2) igniting the flammable substance thereby fusing the wax and oil into a coherent mass having a liquefication temperature 50 to 80° F. above the temperature of the water on which the mass is floating.

2. A method for containing an oil mass floating on water which method comprises incorporating wax by the method of claim 1 into the oil mass at the perimeter of the oil mass to form a ring of solidified material of sufficient width and depth to contain liquid oil surrounded by the treated mass.

3. The method of claim 1 wherein the inflammable substance is selected from hydrocarbons in the kerosene boiling range.

4. The method of claim 1 wherein the addition of wax is about 5 to 50 percent by weight of the oil to which it is added.

5. The method of claim 2 wherein the inflammable substance is selected from hydrocarbons in the kerosene boiling range.

References Cited
UNITED STATES PATENTS

| 3,198,731 | 8/1965 | De Lew | 210—42 |
| 3,536,616 | 10/1970 | Kondoh et al. | 210—40 |

OTHER REFERENCES

A. D. Little: Combating Pollution Created by Oil Spills—June 1969, pp. 80–81.

SAMIH N. ZAHARNA, Primary Examiner

I. CINTINS, Assistant Examiner

U.S. Cl. X.R.

210—59, DIG. 21